C. R. CARPENTER.
CUTTING OFF MACHINE HEAD AND THE LIKE.
APPLICATION FILED OCT. 12, 1912.
1,083,663.
Patented Jan. 6, 1914.
3 SHEETS—SHEET 1.
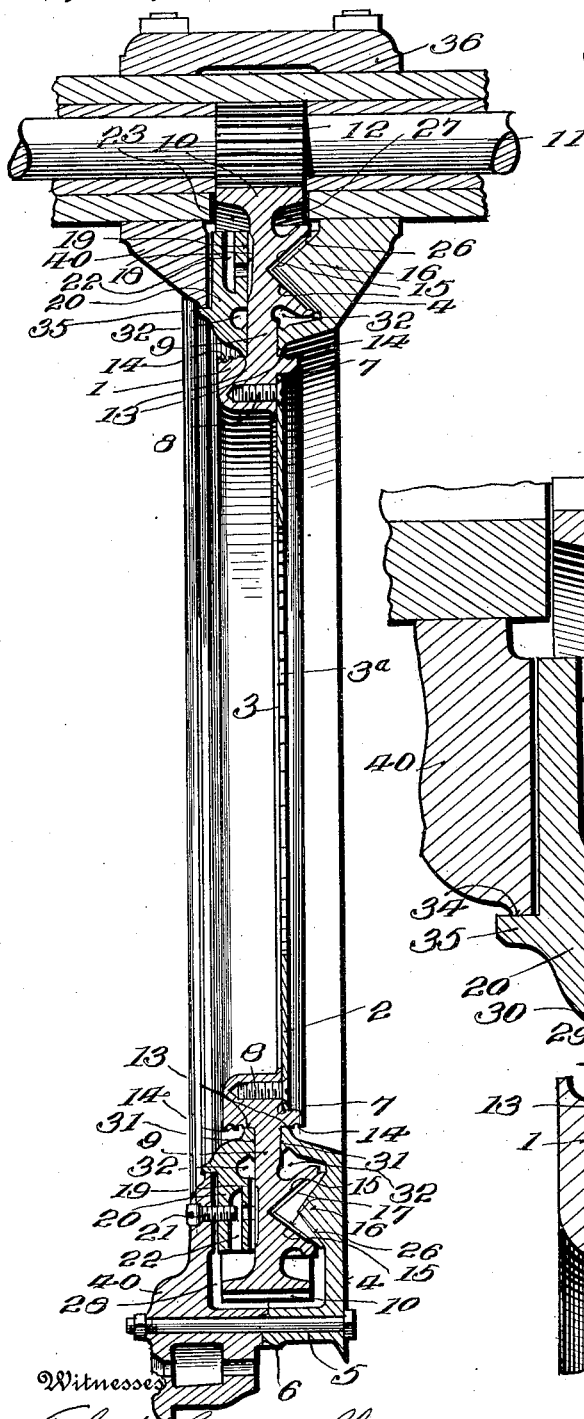
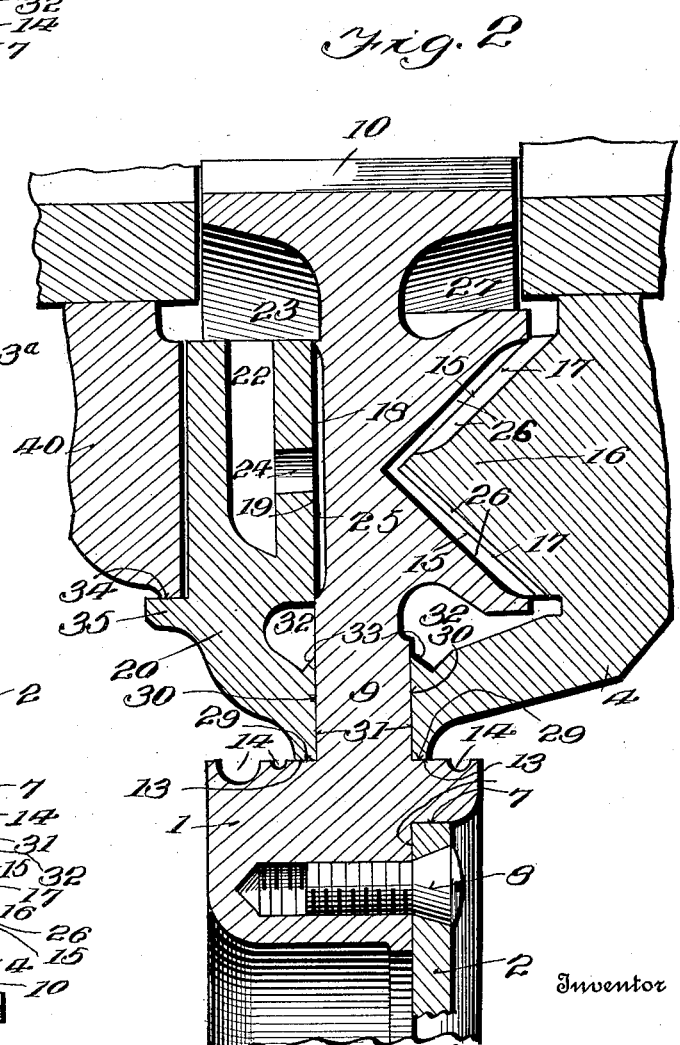

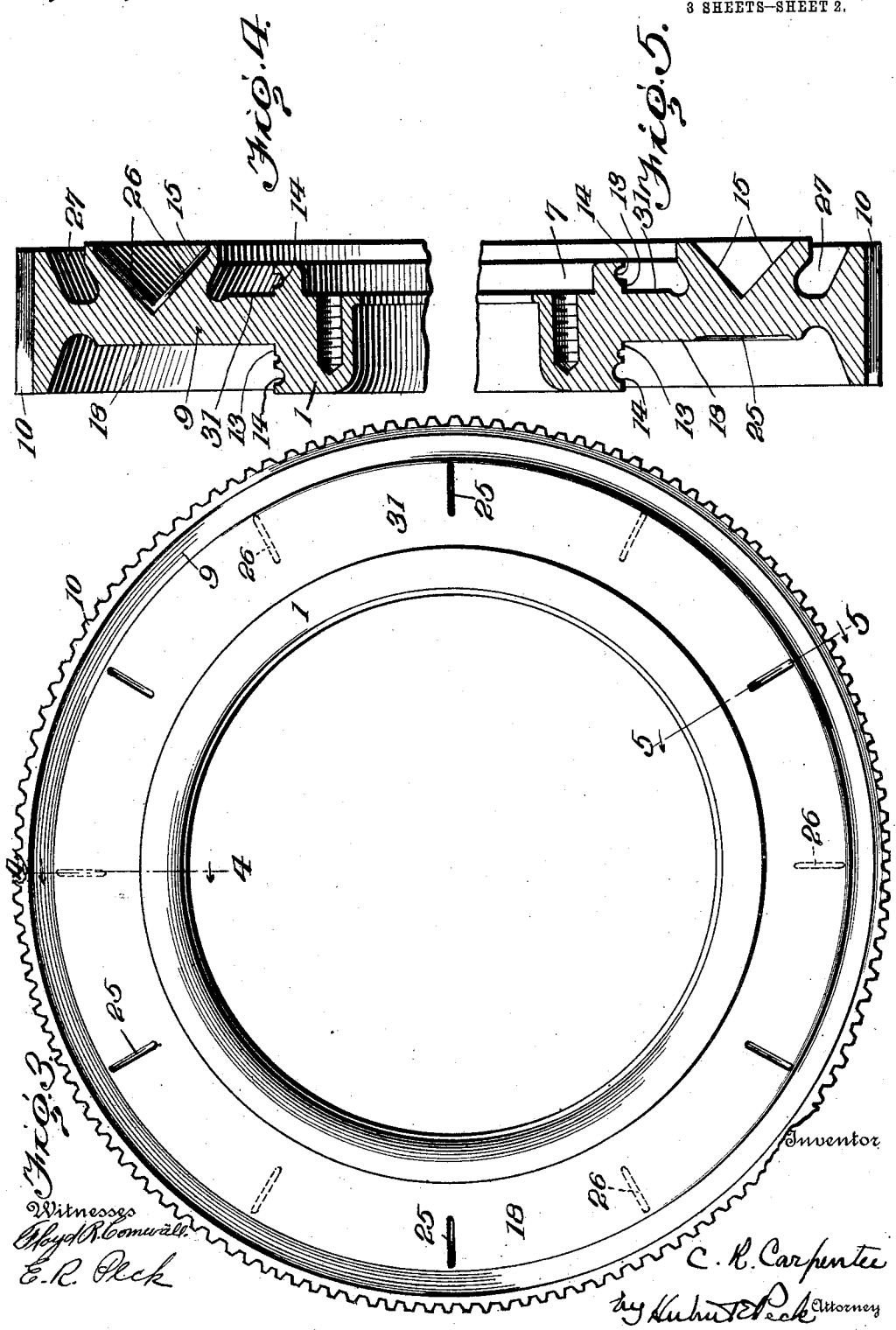

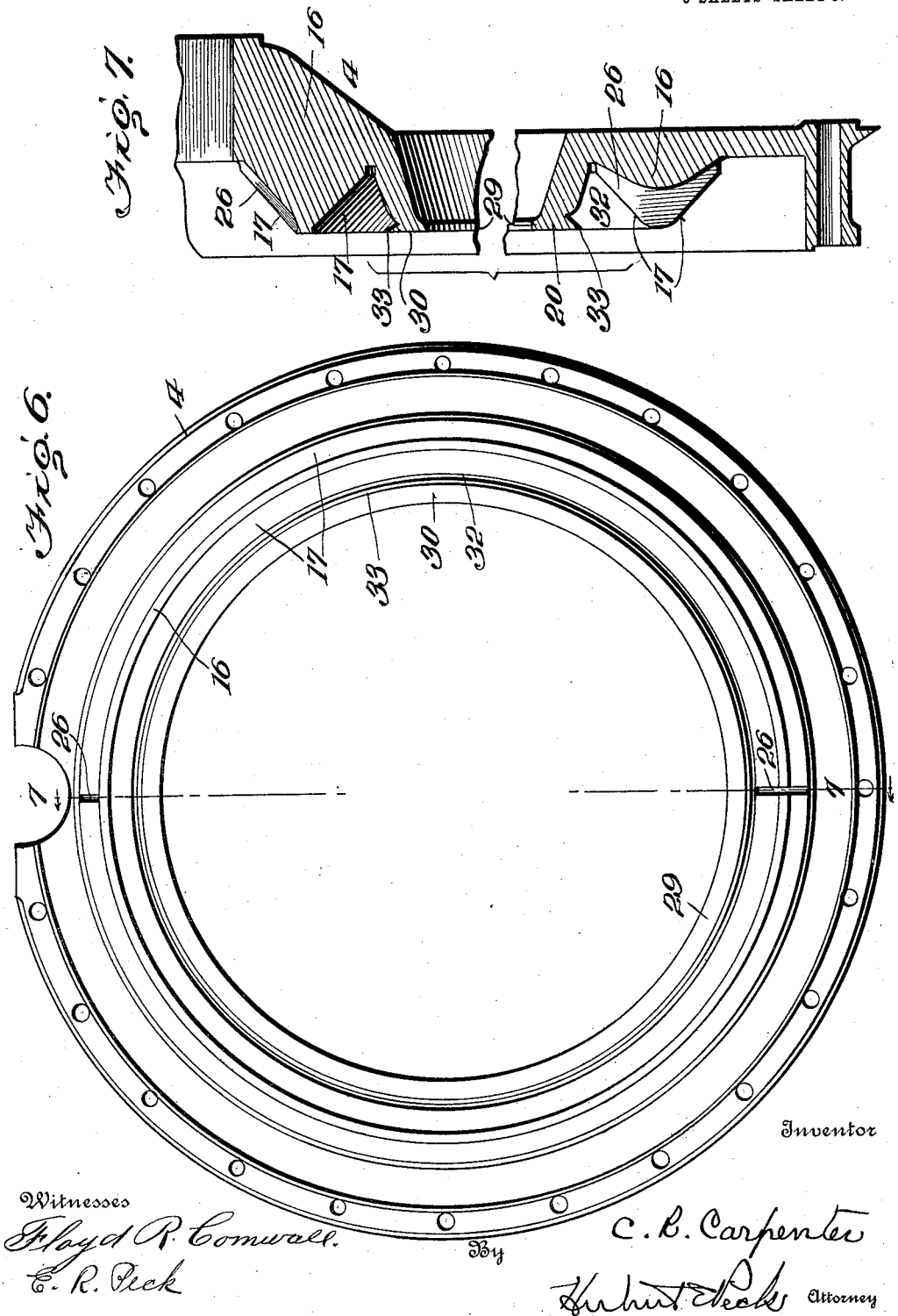

UNITED STATES PATENT OFFICE.

CHARLES R. CARPENTER, OF RACINE, WISCONSIN, ASSIGNOR TO GEORGE GORTON, OF RACINE, WISCONSIN.

CUTTING-OFF-MACHINE HEAD AND THE LIKE.

1,083,663.   Specification of Letters Patent.   Patented Jan. 6, 1914.

Application filed October 12, 1912. Serial No. 725,484.

*To all whom it may concern:*

Be it known that I, CHARLES R. CARPENTER, a citizen of the United States, residing at Racine, in the county of Racine and State of Wisconsin, have invented certain new and useful Improvements in and Relating to Cutting - Off - Machine Heads and the like, of which the following is a specification.

This invention relates to certain improvements in cutting off machinery; and the objects and nature of the invention will be readily understood by those skilled in the art in the light of the following explanation of the accompanying drawings illustrating what I now believe to be the preferred embodiment from among other formations, structures and arrangements within the spirit and scope of my invention as defined by the appended claims.

An object of the invention is to provide certain improvements in cutting off head construction illustrated in the patent application of George Gorton, filed May 7, 1912, S. No. 695,794, with the ends in view of simplifying the structure and reducing the length of the rotary saw-blade-carrying drum.

A further object of the invention is to provide certain improvements in cutting off machine head construction to attain maximum durability, accuracy and effectiveness.

A further object of the invention is to provide improvements in cutting off machinery whereby a rotary saw-blade-carrying drum of a minimum length can be employed.

A further object of the invention is to provide improvements in cutting off machinery to attain maximum lubricating efficiency for the rotary saw-carrying drum and to reduce to the minimum possibility of leakage of cutter-lubricating oil to the drum bearings.

The invention consists in certain novel features of construction and in combinations or arrangements as more fully and particularly set forth hereinafter.

Referring to the accompanying drawings:—Figure 1, is a sectional view taken diametrically through a cutting off machine head constructed in accordance with my invention. Fig. 2, is an enlarged detail sectional view. Fig. 3, is a detail side elevation of the rotary saw blade-carrying member taken from the left hand side thereof referring to Fig. 1. Fig. 4, is a section on the line 4—4, Fig. 3. Fig. 5, is a section on the line 5—5, Fig. 3. Fig. 6, is a detail inner side elevation of the right hand casing section, referring to Fig. 1. Fig. 7, is a detail section on the line 7—7, Fig. 6.

The particular cutting off machine head illustrated as an example comprises a suitably supported hollow box or case having an opening extending therethrough to receive the rotary ring, hub or drum 1, carrying and spanned by the saw blade 2, having central work-receiving opening 3, and provided with cutters 3ª, arranged around and projecting into said opening to act on the stock or other work extending through said opening and the drum. The case or box of the example illustrated, is composed of two ring-like or annular sections 4, 40, meeting at the outer portions of their inner vertical faces and rigidly secured together by any suitable means, such as transverse bolts 5, extending through the outer edge or circumferential portions of the sections. The inner faces of the outer edge portions meet about midway between the outer vertical side faces of the completed case to form the preferably oil-tight joint 6, so that the completed case is trough-like or approximately U-shaped in cross section to form a receptacle to surround the drum and inclose the driving means and bearings therefor.

In the particular example illustrated, the drum is internally recessed at one end to provide a seat or socket 7, receiving the peripheral or edge portion of the saw blade and in which said blade can be removably clamped by suitable means, such as machine screws 8. In this particular example, the peripheral edge of the blade is within and surrounded by the drum, with the adjacent end of the drum projecting beyond the vertical plane of the blade so that the lubricating or cooling liquid supplied to the cutters while in the work, will flow down both the inner and outer faces of the blade to the inner surfaces of the drum and will move outwardly therein in opposite directions to discharge from the edges of both the front and rear ends of the drum.

The drum 1, is driven by a surrounding wheel, flange, web, or disk 9, the center or hub of which is formed by said drum. The rim, peripheral or circumferential edge portion of this web 9, is provided with gear teeth 10, so that the web and teeth constitute a spur gear through which the drum is driven. If so desired, the drum, and spur gear (web 9 and teeth 10) can be formed integral as by a single casting. Any suitable means can be provided for driving said gear to rotate the drum and saw blade carried thereby. For instance, I show a drive shaft 11, parallel with the axis of rotation of the saw-blade-carrying drum and extending through the edge or circumferential portion of the case and provided with pinion 12, meshing with teeth 10, of the spur gear. This shaft 11, can be driven by any suitable means or in any suitable manner, not disclosed herein.

The web 9, of the drum-driving gear extends radially from the drum 1, in a plane intermediate the ends of said drum so that the drum projects forwardly and rearwardly beyond said web. The drum ends at the opposite side faces of said web, are formed with the circumferential cylindrical smooth-faced portions 13, while the projecting opposite ends of the drum beyond said smooth-faced portions 13, are formed with circumferential cylindrical portions having annular cutter-cooling or lubricating-liquid-collecting and slinging (or centrifugally-discharging) grooves and adjacent edges 14.

The main bearings for the drum are of greater diameter than the drum and are located between the exterior of the drum and the rim of the web 9, formed with teeth 10, and are formed by annular side face portions of the web 9, and the inclosing case.

In the particular example illustrated, one side face of the web 9, is enlarged laterally to provide an annular V-groove forming the diverging bearing faces 15, while the inner side face of the case section 4, is correspondingly formed with an annular V-rib 16, fitting within said V-groove and forming the converging bearing faces 17, fitting the corresponding bearing faces 15. A double cone bearing is thus provided whereby the drum is maintained properly centered within the case and to receive and sustain the radial thrusts and stress of the cutter or saw blade when in action. The end of the drum that carries and incloses the saw or cutter blade is preferably arranged within the front section 4, of the case and is preferably arranged within the circle of said double cone bearing so that the radial thrust of the saw blade in action will be directly sustained by said bearing to reduce twisting or torsional strains on the drum to the minimum.

The bearing within the case and at the opposite side face of the web 9, is preferably formed by a vertical flat annular bearing face 18, directly opposite the double cone bearing, and an abutting corresponding parallel vertical side face 19, of a portion of the rear section 40, of the case. The bearings 18, 19, will hence sustain longitudinal or endwise thrust only of the drum and its enlarged surrounding web or gear, and is utilized for endwise or longitudinal adjustment of the drum to take up wear and to maintain the desired accurate centering and fit of the drum and cone bearing. To this end, the case section 40, comprises or includes a longitudinally adjustable bearing ring or annulus 20, having its inner side face forming the bearing surface 19. This ring 20, is concentrically arranged within the case section 40, and is carried thereby and centered and longitudinally adjustable therein. The ring 20, is adjusted and held in the desired adjustment by any suitable manually controlled means. For instance, I show adjusting screws 21, for this purpose and accessible for adjustment at the rear face of the case. The ring 20, is interposed between the vertical inner side face of the case section 40, and the vertical side face 18 of the drum gear web, and is preferably formed throughout its circle with annular series of radial oil pockets 22, open at their outer ends through the surrounding or peripheral edge of the ring and into the oil space 23, between a side face of web 9, and the adjacent inner face of the case section 40, and between the overhanging rim carrying teeth 10, and the circumferential edge of the ring 20. Lateral oil ducts 24, lead from these pockets to the bearing faces 18, 19, to supply oil thereto. Said bearing faces 18, 19, at their outer edges also extend to the annular surrounding oil space 23, and can receive oil directly therefrom. The bearing surface 18, is preferably formed with spaced radial oil grooves 25, (if so desired the surface 19, can also be formed with such grooves) to uniformly distribute a plentiful supply of oil throughout said bearing surfaces. The double cone bearing surfaces 15, 17, can also be formed with spaced transverse or radial oil distributing grooves 26, to uniformly distribute a plentiful supply of oil throughout said surfaces. These grooves 26, are supplied with oil from the annular oil space 27, corresponding to and on the opposite sides of the web 9, from space 23, and surrounded by the wheel rim and in fact formed by a deep annular groove or pocket in the web 9.

The case surrounds the drum and incloses the driving gear (9, 10) surrounding said drum and forms an oil tank or receptacle 28, in which said gear revolves and from which oil is carried up in the oil spaces 23, 27, and dropped into pockets 22, and to the bearings and from which oil is also carried up by the several bearing surfaces of the rotating gear.

The opposite side walls of the case are formed with comparatively narrow cylindrical smooth-face edges 29, exteriorly surrounding the drum ends closely adjacent to the opposite side faces of the web 9. These cylindrical edges 29 fit around the smooth cylindrical circumferential surfaces 13 of the drum so that the ends of the drum (exteriorly provided with grooves 14) project in opposite directions exteriorly of the case although they are preferably overhung by the side walls of the case. The opposite side walls of the case are also provided with annular vertical parallel smooth radial inner-side surfaces 30, meeting the cylindrical surfaces 29, approximately at right angles, and bearing against the corresponding smooth parallel opposite side faces 31, of the inner portion of the web 9.

Means for retaining oil in the case are provided between the bearing surfaces 18 and 19, 15 and 17, and the engaging surfaces 30, 31, to prevent excessive leakage of oil between surfaces 30, 31, and to and around the drum ends. For instance, I show annular oil catching or retaining pockets, chambers, or grooves 32, open at the opposite side faces 31, of the web 9, and formed in the opposite inner side walls of the case and of greater diameter than the surfaces 30, thereof and interposed between said surfaces 30, and the bearings 18, 19, and 15, 17, and open to said bearings to receive the oil flowing or leaking therefrom toward the axis of rotation of the drum. The inner side walls of these two pockets 32, terminate in or at oil stripping edges 33, forming the peripheral edges of the case surfaces 30, and designed to strip surplus oil from the web surfaces 31, and prevent excessive flow of oil along said surfaces 31, toward the axis of rotation of the drum. The tendency of the oil is to work from the main bearings at opposite side faces of the web 9, inwardly along the web 9, toward the axis of rotation, that is, to the circumferential surface of the drum and to cause oil leakage from the drum ends.

When a cutting off machine is at work, the cutters in the work are flooded with cutter cooling and lubricating liquid, and this liquid discharges from the cutter disk into the interior of the drum and flows from the drum ends and tends to work around the exterior of the drum and into the main bearings. It is exceedingly desirable to keep this cooling liquid out of the drum bearings, and also while it is desirable to freely lubricate the drum bearings, yet it is desirable to prevent undue leakage of oil therefrom. The grooves 14, in the circumferential portions of the exposed or projecting ends of the drum serve to collect the cooling liquid tending to work back from the drum end edges toward the drum bearings and to cause said liquid to be slung or centrifugally discharged from the drum before reaching said bearings. In fact, these portions of the drum act as dams or guards preventing, or at least reducing, the back flow of said liquid at the exterior of the drum. In the event that said cooling liquid does work back on the exterior of the drum past said grooves 14, the snugly fitting surfaces 13, 29 and 30, 31, will serve to hold back such liquid. If by any possibility, such cooling liquid should work back between said surfaces 13, 29 and 30, 31, the edges 33, and oil pockets 32, are designed to hold back such liquid from the main bearings. Furthermore, the pockets 32, edges 33, and smooth engaging surfaces 30, 31, and 13, 29 are designed to constantly maintain films of oil between surfaces 30 and 31, and 13 and 29, and thereby prevent access of the cooling liquid between said surfaces. The design is intended to so maintain said films of oil as to prevent displacement thereof by the cooling liquid, and thereby prevent entrance of the cooling liquid between the closely fitting surfaces 13, 29; 30, 31. In fact, the intention is to maintain films of oil that will expel the cooling liquid and yet will not result in undue or objectionable leakage of oil around the drum and from the case.

In order to constantly maintain the desired close fit between the case surfaces 30, and the rotating-element-surfaces 31, even after wear, I preferably form the ring 20, with the pocket 32, edge 33, surface 30, and surface 29, located at one side of the rotating element, to permit adjustment thereof simultaneously with the main bearing adjustment. The bearing adjusting ring hence becomes a part of the case wall, and to accommodate the same, I form the rear case section 40, with an enlarged central opening surrounded by cylindrical edge wall 34, of much greater diameter than the drum. The ring 20, is arranged at the inner side face of said section 40, and between the same and the web 9, and is formed with a central opening to snugly receive the drum, as heretofore described. Said ring at its outer side is formed with a rearwardly projecting cylindrical hub or flange 35, concentric with the axis of rotation of the drum and concentrically and snugly fitted within the wall 34, and arranged to slide longitudinally therein as the ring is adjusted. The ring is thereby centered, supported and guided.

In the specific example illustrated, the edge portion of the case receiving the pinion or drive shaft 11, is laterally enlarged and provided with a cap 36, bolted thereto, but of course my invention is not so limited. It should also be understood that my invention is applicable to cutting off machine heads whether such heads form reciprocating or swinging feed carriages, or whether such heads be fixed and the feed works be provided to move the work as the cutters sever the same.

The various parts of the head described can be readily assembled and set up, as the adjusting ring can be slipped to place in the rear case section, the two case sections can then be readily brought laterally together for bolting with the rotary element therebetween.

It is evident that various changes, variations and modifications might be resorted to without departing from the spirit and scope of the following claims and hence I do not wish to limit myself to the disclosure hereof.

What I claim is:—

1. A cutting off machine head comprising an annular case, and a hollow rotary drum extending through and rotating in said case and provided with and spanned by an internal saw blade, said drum provided with a driving gear inclosed within said case, side faces of said case and gear providing the main bearings for the drum, said case including a main bearing ring adjustable longitudinally of the case and formed with a concentric opening receiving said drum and providing a cylindrical edge circumferentially fitting said drum.

2. A cutting-off machine head comprising an annular case, a rotary drum extending through said case and provided with and spanned by a saw blade and having an exterior driving gear rotating in and inclosed by said case, said drum formed with cylindrical circumferential portions at both sides of said gear, opposite portions of said case having cylindrical edges receiving and fitting said cylindrical portions of the drum, said gear having annular radial smooth surfaces at the opposite sides of its inner portion and the inner faces of said opposite portions of the case having surfaces bearing against said side surfaces of the gear.

3. A cutting off machine head comprising a case, and a rotary saw-blade-carrying hollow drum extending through and rotating in said case and provided with a driving gear inclosed in the case, said case and gear providing main bearings for the drum arranged at side faces of the gear and case, said case and gear providing closely fitting smooth radial surfaces interposed between said bearings and the drum, and said case and drum providing closely fitting cylindrical smooth surfaces, said cylindrical and radial surfaces adapted to maintain oil films to exclude liquid tending to work back toward said main bearings.

4. A cutting off machine head comprising a case, a hollow rotary drum carried thereby, rotating therein and extending therethrough, driving means for said drum, said drum being internally recessed at one end to form an internal annular seat, a removable saw blade having a central work receiving opening and cutters, said blade spanning said drum and inserted therein with its peripheral portion fitting said seat, and means securing said blade against said seat, said end of the drum being exposed and exteriorly formed to discharge cutter cooling liquid therefrom.

5. A cutting off machine head comprising an annular case, and a rotary saw-blade drum supported therein and provided with a radially projecting member inclosed and rotating within said case, said case and member providing drum centering and radial thrust receiving bearings of greater diameter than the drum, said case and member providing closely engaging surfaces arranged at opposite side faces of said member and interposed between said bearings and the circumference of the drum to prevent excessive leakage of oil inwardly toward the drum and to exclude foreign liquid tending to work from the drum outwardly toward said bearings.

6. A cutting off machine head comprising drum supporting means, and a rotary saw blade drum having a radial projecting member rotating therewith, said drum having cylindrical circumferential surfaces beyond opposite side faces of said member, said case having cylindrical edges surrounding and fitting said surfaces of the drum, said means providing side walls at the opposite side faces of said member, said walls and member forming main bearings for said drum, and closely fitting annular radial surfaces at opposite sides of said member and interposed between said bearings and said cylindrical surfaces.

7. A cutting off machine head comprising a rotary saw-blade-carrying drum having an enlarged exterior member rotating therewith, said drum having circumferential cylindrical portions beyond opposite side faces of said member, and supporting means for and in which said drum and member rotate, said means having cylindrical edges surrounding and fitting said cylindrical portions of said drum, said means and member providing bearings for the drum at opposite side faces of said member, said means providing annular oil catching pockets at both side faces of said member and of greater diameter than said drum and interposed between said bearings and said cylindrical portions of the drum.

8. A cutting off machine head comprising a saw blade-carrying rotary drum having an exterior driving member of enlarged diameter, and means for carrying and supporting said drum and in which the drum and its member rotate, said means and member providing drum centering and thrust-sustaining bearings at the side faces of said member and of greater diameter than said drum, said means providing annular oil catching pockets at the opposite side faces of said member and annular radial surfaces closely fitting the opposite side faces of said member and interposed between said drum and said pockets.

9. A cutting off machine head comprising a hollow annular case, and a rotary saw-blade-carrying drum extending therethrough and rotating therein and provided with an exterior driving member rigid therewith and arranged between the side walls of said case, said member and the side walls of said case providing annular bearings for said drum of greater diameter than the drum, said walls having annular radial surfaces closely fitting the opposite side faces of said member adjacent to the drum, said side walls also providing oil collecting means at the opposite side faces of said member and interposed between said bearings and said annular radial surfaces.

10. A cutting off machine head comprising a hollow annular case built up of annular sections, and a hollow saw-blade-carrying rotary drum extending through said case with its opposite ends exposed beyond the case and exteriorly formed to centrifugally discharge liquid therefrom, said drum having an exterior driving member arranged between the side walls of said case, said member and the side walls of the case forming longitudinal and radial-thrust-sustaining main bearings for the drum and closely fitting cooling-liquid-excluding surfaces interposed between said bearings and said drum ends.

11. A cutting off machine head comprising a case, a hollow saw-blade-carrying rotary drum rotating in said case and provided with an exterior driving member, said case providing opposite side walls between which said member rotates, said member and said walls providing main bearings for said drum arranged at the opposite sides of said member, said walls also providing annular radial smooth surfaces closely fitting the opposite side faces of said member adjacent to said drum and oil collecting pockets at the opposite side faces of said member and interposed between the drum and said bearings, said case including a longitudinally adjustable member for adjusting said bearings and said closely fitting annular surfaces.

12. A cutting off machine head comprising an annular case, and a hollow rotary drum arranged within the center opening of the case and adapted to receive a saw blade having a center work-receiving opening, said drum provided with a radial projecting member rigid therewith and arranged intermediate the ends thereof and located between the side walls of said case, said member and said side walls providing drum-centering and radial-thrust-receiving bearings for said drum, the portions of said member that form surfaces of said bearings being provided with radially arranged oil grooves, said side walls having radial surfaces fitting the side faces of said member between said bearings and said drum.

13. A cutting off machine head comprising a rotary saw-blade-carrying drum having an enlarged exterior member rigid therewith, and supporting means for and in which said drum and member rotate, said means and member providing bearings for the drum at opposite side faces of said member, said means providing annular oil catching pockets at both side faces of said member and interposed between said bearings and the drum.

14. A cutting off machine head comprising a case, and a rotary saw-blade-carrying hollow drum extending through and rotating in said case and provided with a driving gear inclosed in the case, said case and gear providing main bearings for the drum arranged at side faces of the gear and case, said case and gear providing engaging radial surfaces interposed between said bearings and the drum, said drum and case providing engaging cylindrical surfaces, said case including a main bearing ring adjustable longitudinally with respect to the axis of rotation of the drum and forming said radial and cylindrical surfaces of the case located at one side of said gear.

15. A cutting off machine head comprising an annular case, and a rotary saw-blade drum supported therein and provided with a radially projecting member inclosed and rotating within said case, said case and member providing drum-centering and radial-thrust-receiving bearings of greater diameter than the drum, said case and member providing engaging surfaces arranged at opposite side faces of said member and interposed between said bearings and the circumference of the drum, said case embodying a bearing ring adjustable toward and from said member and providing one of said surfaces of the case.

In testimony whereof I affix my signature in presence of two witnesses.

CHARLES R. CARPENTER.

Witnesses:
DAVID G. JANES,
EDGAR S. CRAIG.